(12) United States Patent
Matlik (10) Patent No.: US 9,669,470 B2
(45) Date of Patent: Jun. 6, 2017

(54) CLAMPING DEVICE

(71) Applicant: SANDVIK INTELLECTUAL PROPERTY AB, Sandviken (SE)

(72) Inventor: Gunnar Matlik, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 144 days.

(21) Appl. No.: 14/826,670

(22) Filed: Aug. 14, 2015

(65) Prior Publication Data

US 2016/0052064 A1  Feb. 25, 2016

(30) Foreign Application Priority Data

Aug. 19, 2014  (EP) ..................................... 14181390

(51) Int. Cl.
 *B23B 31/26* (2006.01)
 *B23B 31/40* (2006.01)
 *B23B 29/04* (2006.01)

(52) U.S. Cl.
 CPC .......... *B23B 31/265* (2013.01); *B23B 29/046* (2013.01); *B23B 31/4033* (2013.01); *B23B 2231/24* (2013.01); *B23B 2250/12* (2013.01); *B23B 2260/02* (2013.01); *B23B 2260/034* (2013.01); *B23B 2265/12* (2013.01);
 (Continued)

(58) Field of Classification Search
 CPC . B23B 29/046; B23B 31/265; B23B 31/4033; B23B 2231/24; B23B 2260/02; B23B 2260/034; B23B 2265/12; Y10T 279/1008; Y10T 279/1012; Y10T 409/309408; Y10T 409/309464
 See application file for complete search history.

(56) References Cited

U.S. PATENT DOCUMENTS 3,301,108 A * 1/1967 Heiner .................... B23B 31/40
  279/2.12
3,542,385 A  11/1970 Seitter
(Continued)

FOREIGN PATENT DOCUMENTS

CH          400723 A * 10/1965  ............. B23B 23/02
DE     10241860 A1 *  3/2004  ........... B23B 29/046
(Continued)

*Primary Examiner* — Eric A Gates
(74) *Attorney, Agent, or Firm* — Corinne R. Gorski (57) ABSTRACT

A clamping device for releasably holding a tool holder shank formed with a bore includes a housing having a forwardly facing surface and a bore. A drawbar is mounted reciprocally movable inside the bore and in a forward end has engagement device, which is arranged to engage with an engagement formation inside the bore of the tool holder shank. The drawbar is, in a rear portion, formed with a drawbar aperture, and a cam shaft extending through the drawbar aperture and being rotatably journalled in the housing and arranged to impart an axial displacement to the drawbar in relation to the housing. The cam shaft includes first and second spaced apart cam formations and an intermediate circular cylindrical portion located between the cam formations, wherein the first and second cam formations are journalled in a first and second seating apertures, respectively, in the housing on opposite sides of the drawbar.

5 Claims, 6 Drawing Sheets (52) U.S. Cl.
CPC ............... *Y10T 279/1008* (2015.01); *Y10T 409/304032* (2015.01); *Y10T 409/309464* (2015.01)

(56) References Cited

U.S. PATENT DOCUMENTS

| | | | | |
|---|---|---|---|---|
| 4,981,057 | A * | 1/1991 | von Haas | B23B 29/046 279/72 |
| 5,340,248 | A | 8/1994 | Enbergs | |
| 5,415,066 | A * | 5/1995 | Erickson | B23B 29/046 408/239 R |
| 5,452,631 | A * | 9/1995 | Erickson | B23B 29/046 409/234 |
| 5,851,091 | A * | 12/1998 | Klement | B23B 29/046 279/2.02 |
| 7,322,779 | B2 * | 1/2008 | Kress | B23B 31/102 409/232 |
| 8,257,003 | B2 * | 9/2012 | McCormick | B23B 31/201 279/20 |
| 8,312,615 | B2 * | 11/2012 | Frota de Souza Filho | B23B 29/046 29/525.01 |
| 8,875,606 | B2 * | 11/2014 | Hecht | B23B 29/046 409/234 |
| 2015/0174666 | A1 * | 6/2015 | Matlik | B23B 31/10 279/9.1 |
| 2016/0052063 | A1 * | 2/2016 | Englund | B23B 31/265 279/2.1 |
| 2016/0052065 | A1 * | 2/2016 | Englund | B23B 31/4006 279/2.02 |
| 2016/0195119 | A1 * | 7/2016 | Bookheimer | F16B 19/02 29/428 |

FOREIGN PATENT DOCUMENTS

| | | | | |
|---|---|---|---|---|
| DE | 102005015787 A1 * | 10/2006 | ........... | B23B 31/261 |
| DE | 102007043953 A1 * | 4/2009 | ........... | B23B 29/046 |
| DE | WO 2012104671 A2 * | 8/2012 | ........... | B23B 29/046 |
| DE | 102011116572 A1 * | 4/2013 | ........... | B23B 31/103 |
| EP | 2641679 A2 | 9/2013 | | |
| JP | 56139807 A * | 10/1981 | ........... | B23B 31/201 |
| JP | 2008110456 A | 5/2008 | | |
| SE | WO 2005032747 A1 * | 4/2005 | ........... | B23B 29/046 |
| WO | 2005322747 A1 | 4/2005 | | |

* cited by examiner

CLAMPING DEVICE

RELATED APPLICATION DATA

This application claims priority under 35 U.S.C. §119 to EP Patent Application No. 1418 390.7, filed on Aug. 19, 2014, which the entirety thereof is incorporated herein by reference.

TECHNICAL FIELD

The present disclosure relates to a clamping device for releasably holding a tool holder shank formed with a bore.

BACKGROUND

Clamping devices are well known and widely used within the manufacturing industry for holding different kinds of tools for machining of work pieces of various materials. The clamping device may optionally be carried on a rotatable spindle, for holding e.g. a drill or a milling tool, or be unrotatable for holding e.g. a lathe tool.

One advantage with a clamping device of this kind is that it allows for a quick clamping of the tool, simply by rotating the cam shaft by about 100° to 200°, which has the effect that the tool will be dawn by a large force into the mounting bore of the housing and thereby be securely held by the clamping device. Also, release of the tool can be easily and rapidly performed by rotating the cam shaft in the reverse direction. Normally, the bore of the housing, as well as the tool holder shank are also made slightly conical, such that they are tapered in an axial direction rearward from the tool. In this way the connection between the tool and the clamping device can be made totally free from any play, which has the effect that the tool will be held in an exact position, which allows for high precision machining by means of the tool.

However, one disadvantage with prior art clamping devices of this kind is that the drawbar is made with a comparatively large cross-sectional dimension, such that it cannot, with the desirable cross-sectional measure of the tool holder shanks frequently being used, be inserted through the bore of the housing from its forward end.

A reason why the drawbar has to be made with such a large cross-sectional dimension is that the drawbar aperture has to accommodate a cam shaft having a cam formation of a sufficient size in order to provide the desired displacement of the cam shaft and the desired force reduction for the operator performing the rotation of the cam shaft during clamping and releasing. However, in order to ensure sufficient tensile strength of the drawbar to withstand the desirable forces by which the tool holder shank is drawn into the shank bore, the remaining leg portions of the drawbar surrounding the drawbar aperture must be made with a sufficient cross-sectional dimension.

An example of a prior art design of a clamping device will be described more in detail in connection with the hereinafter detailed description of the present disclosure. Accordingly, in order to position the drawbar in place when assembling the clamping device, the drawbar has up to the present been inserted from the rear end of the clamping device or a shank bore sleeve has been mounted in the forward end of the clamping device after the drawbar has been inserted into the housing from the forward end. One consequence of this is that the overall dimensions of the clamping device cannot be made as small and slim as desired. Another consequence is that the clamping device will comprise extra mounting details, which will render the clamping device more expensive to manufacture, both in respect of material costs and costs for performing the assembling.

Figure 3:
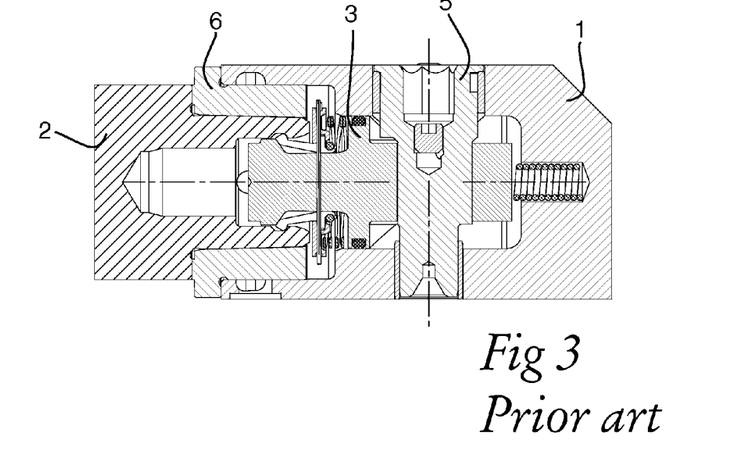

A prior art clamping device is described by reference to FIGS. 1-3. This prior art clamping device is of an unrotatable kind, which is adapted to hold e.g. a lathe tool. As evident from FIG. 1 an outer housing of the clamping device 1 is generally box-shaped and is shown connected to a schematically illustrated tool holder 2.

Figures 1, 2:
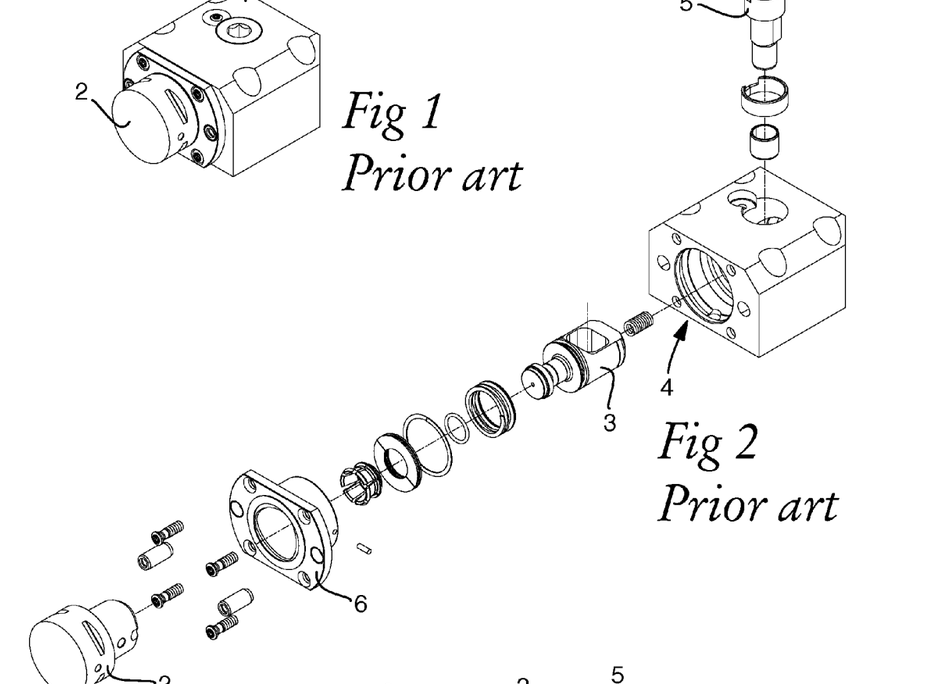
FIGS. 1-3 illustrate an embodiment of a prior art clamping device.

FIG. 2 is an exploded perspective view of the clamping device and the tool holder showing all the separate components comprised in the clamping device. One of the components is a drawbar 3 being inserted into the housing in a bore 4. The drawbar 3 regulates the clamping mechanism (the function of which is not further described herein) between a locked stage, in which the tool holder is firmly coupled to the clamping mechanism, and a released stage in which the tool holder is released from the clamping device.

The regulating of the clamping mechanism is performed by displacement of the drawbar 3 in the axial direction of the bore 4 in the housing. The displacement of the drawbar is in its turn performed by rotating a cam shaft 5, which extend through the housing and through an aperture in the drawbar, and which is provided with a cam formation which as desired can act on a rear surface of the aperture through the drawbar, which will displace the drawbar rearward, or on a forward surface of the aperture, which accordingly will displace the drawbar forward.

However, due to the cam formation being a locking cam surface as well as a releasing cam surface, the cam shaft will have a rather large cross-sectional dimension and accordingly, the aperture of the drawbar has to be formed with a correspondingly large cross-sectional dimension in order to accommodate the cam shaft with its cam formation. As a result, the drawbar will be formed with rather large cross-sectional dimensions, since the leg portions, which connect the forward and rear portions of the drawbar and are situated on a respective side of the drawbar aperture, also must have a certain cross-sectional dimension in order to withstand the forces that will occur.

This has the effect that with the commonly used dimensions of the mounting shanks for tools and tool holders, the drawbar cannot be inserted from the forward end of the clamping device since the passage will be too small. In the herein disclosed prior art clamping device this problem has been solved by mounting a separate sleeve 6 within the bore 4 of the housing which will define the shank bore for the mounting shank of the tool holder. Accordingly, the drawbar is mounted into the housing prior to mounting the shank bore sleeve 6.

One problem with such a solution is that the costs for manufacturing the clamping device will increase. Another problem is that using a separate shank bore sleeve will introduce one further component having its own manufacturing tolerances, which will deteriorate the precision of the machining work performed by means of the tool.

SUMMARY

The present disclosure relates to a clamping device for releasably holding a tool holder shank formed with a bore comprising a housing having a forwardly facing surface and a bore intersecting the forwardly facing surface and extending rearwardly therefrom for receiving the tool holder shank; a drawbar being mounted reciprocally movable inside the bore and which in a forward end comprises engagement means which is adapted to go into engagement with an engagement formation inside the bore of the tool holder shank, the drawbar being in a rear portion formed with a drawbar aperture extending through the drawbar in a transverse direction in relation to a longitudinal axis of the same; and a cam shaft extending through the drawbar aperture and comprising a cam formation, wherein the cam shaft is rotatably journalled in the housing and adapted to impart an axial displacement to the drawbar in relation to the housing by means of the cam formation when rotating the cam shaft.

With the clamping device of the present disclosure, the drawbar is insertable into the housing through the bore of the housing from its forward end.

Accordingly, the drawbar can be made with an overall cross-section dimension, which is so small that it can be inserted through the housing bore from the forward end of the housing. This is accomplished in that instead of a single continuous cam formation, as in prior art clamping devices, the cam shaft is provided with a first and a second cam formation spaced apart by an intermediate circular cylindrical portion.

The first and second cam formations are rotatably journalled in first and second bearing apertures in the housing on the respective sides of the drawbar, whereas the circular cylindrical portion is positioned in the aperture of the drawbar. When rotating, the cam shaft first and second cam surfaces of each cam formation will displace the cam shaft forward or rearward in the longitudinal direction along the center axis of the clamping device such that the circular cylindrical portion of the cam shaft will act upon the drawbar to be displaced in the forward or rearward direction.

The second cam formation is smaller than the first cam formation such that it can be passed through the drawbar aperture during assembling of the clamping device, but the first and second cam surfaces of the first and second cam formations are formed with the same cam pitch per angular measure. In this way, the drawbar aperture, as well as the cross-sectional dimension of the drawbar can be made so small that the drawbar is insertable through the mounting bore from the forward end of the clamping device.

It is apparent that numerous variations and modifications are within the scope of the claims. For example, in the hereinafter described and illustrated exemplary embodiment, the mounting bore of the clamping device is conically formed and has a somewhat "triangular" or polygonal shape in cross section for clamping a tool holder having a similarly shaped mounting shank. However, the mounting bore could also have a different shape for clamping other types of mounting shanks.

In the description and claims the term "forward" is used to indicate a direction or position towards the outer opening of the mounting bore through which the tool holder shank is inserted during clamping. In analogy, the terms "rear" or "rearward" are used to indicate a direction or position away from the outer opening of the mounting bore.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figures 4, 5:
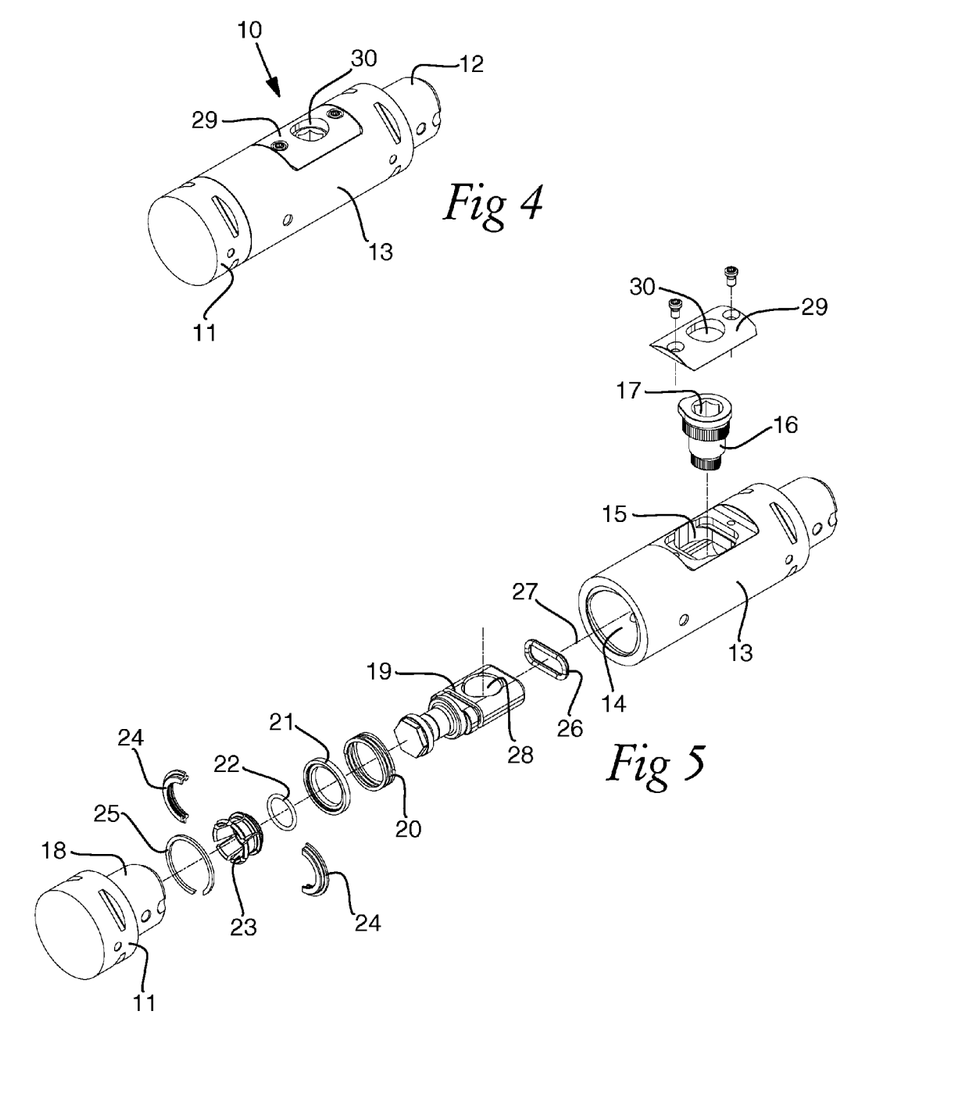
FIG. 4 is a perspective view of a clamping device according to the present disclosure.
FIG. 5 is an exploded perspective view according to FIG. 4.

Referring to FIGS. 4 and 5, a clamping device 10 and cut-off tool holder 11 coupled to a forward end of the clamping device are illustrated in a perspective view. The tool holder is herein schematically illustrated such that only its cut-off, rear end is shown, but in practice some form of machining tool is connected to the tool holder, either integrated with the tool holder or as a separate connected part. In a rear end the clamping device is provided with a mounting shank 12, which is arranged to be connected to a rotating spindle of a working machine or the like (not shown).

The clamping device includes a somewhat elongated, cylindrical shaped housing 13 having an inner bore 14. On its envelope surface the housing is provided with a hole 15 for mounting of a cam shaft 16 into the housing, and which gives access to an engagement formation in form of a hex socket drive 17 at an end of the cam shaft.

FIG. 5 is an exploded perspective view of the clamping device and tool holder 11 according to FIG. 4, showing the various components forming part of the clamping device. Like the clamping device, the tool holder is also provided with a mounting shank 18, which in the illustrated embodiment both are of a kind disclosed in U.S. Pat. No. 5,340,248, comprising a conical shank having an axial bore and a somewhat "triangular" or polygonal, non-circular cross section, which is adapted to be drawn into a correspondingly shaped mounting bore 14. The conical shape ensures a connection free from play in the radial, as well as the axial direction, whereas the "triangular" or polygonal shape ensures an unrotatably fixation of the mounting shank in relation to the mounting bore.

In order to draw the mounting shank 18 of the tool holder into the mounting bore of the clamping device, the latter is provided with a coupling mechanism having a drawbar 19, a compression spring 20, a thrust ring 21, an elastic o-ring 22, a plurality of engagement segments 23, a retainer ring 24 which is split into two pieces and a stop ring 25 arranged within the bore 14 of the cylindrically formed housing 13.

A sealing ring 26 is also arranged between the drawbar and the inner bore of the housing. The hole 15 is formed through the housing wall perpendicular to its center axis 27 and in an assembled state the cam shaft 16 is inserted into the hole and through an aperture 28 in the drawbar. After insertion of the cam shaft into the hole 15, a cover 29 is positioned over the hole and secured by means of screws in order to prevent removal of the cam shaft, wherein the cover 29 in its turn is provided with a through hole 30 to allow access to the hex socket drive 17 of the cam shaft for insertion of a hex socket wrench for setting of the cam shaft in the assembled state.

Figure 6:
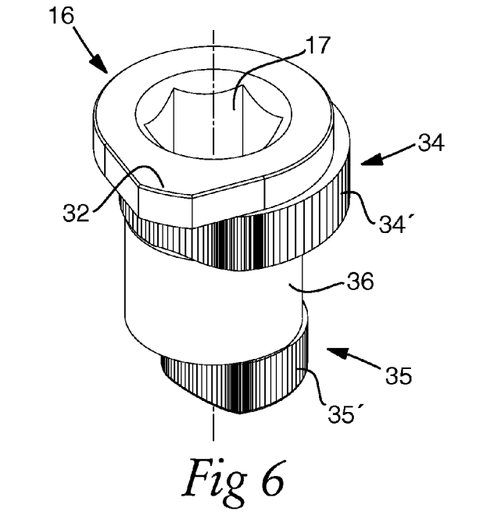
FIG. 6 is a perspective view from above of a cam shaft of the clamping device.
Figure 7:
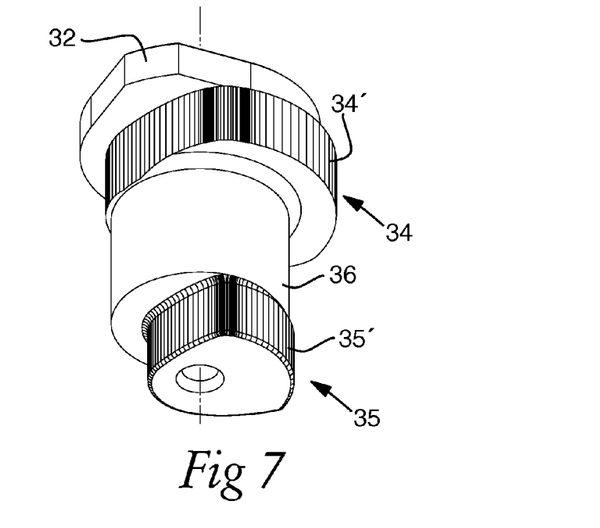
FIG. 7 is a perspective view from below of the cam shaft according to FIG. 6.
Figure 8:
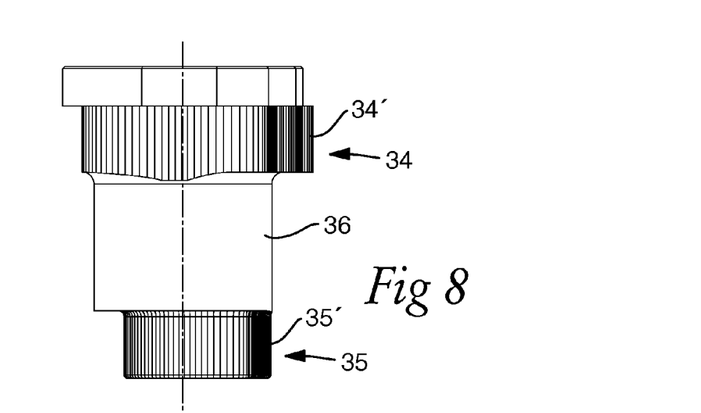
FIG. 8 is a side view of the cam shaft according to FIGS. 6 and 7.
Figure 9:
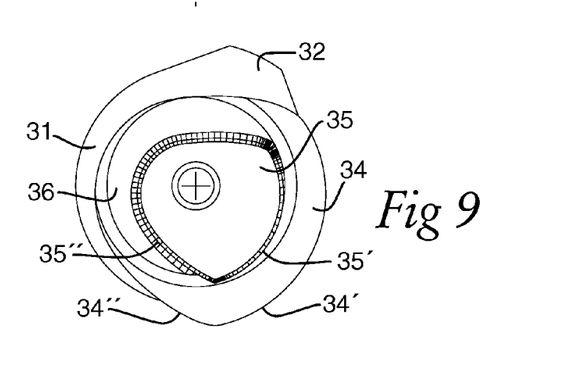
FIG. 9 is a view from below of the cam shaft in FIGS. 6-8.

The cam shaft 16 is illustrated in more detail in a perspective view from above and below according to FIGS. 6 and 7, respectively, a side view according to FIG. 8 and an end view according to FIG. 11, which is seen from below in FIGS. 6-8. In the upper end the cam shaft has a head formed with the hex socket drive 17. Around a part of the hex socket drive the head is provided with a flange 31 which defines the depth of insertion into the housing and is provided with a stop lug 32, which is arranged to interact with stop surfaces within the hole 15 of the housing for restriction of the maximal turning angle of the cam shaft.

Figure 10:
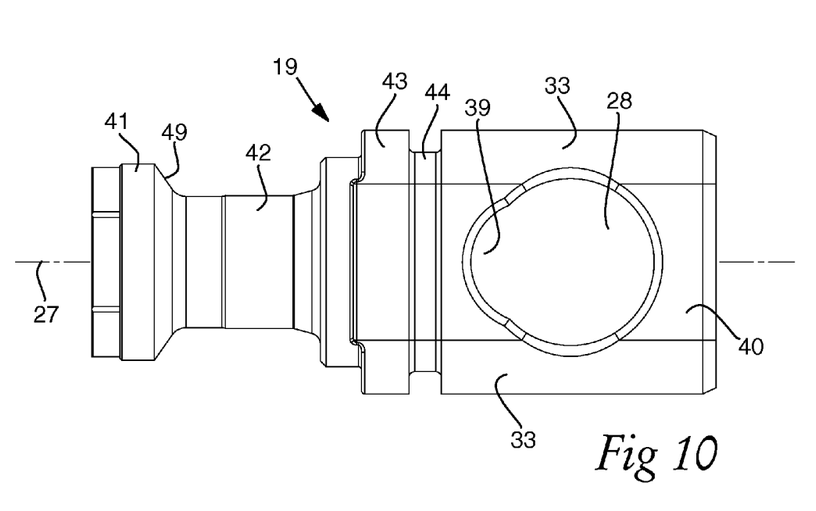
FIG. 10 is a plan view of a drawbar of the clamping device.
Figure 11:
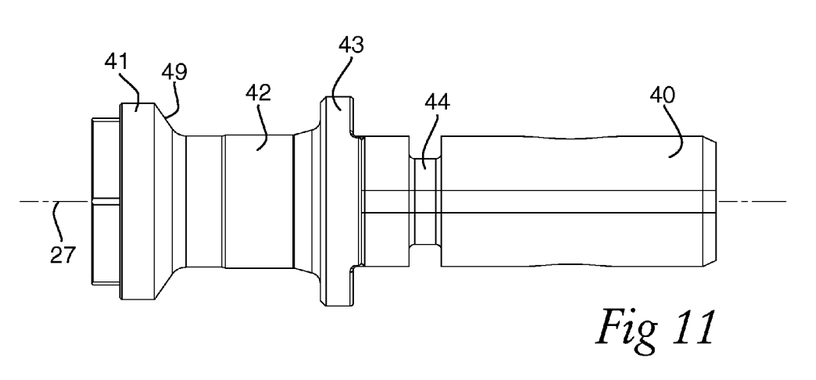
FIG. 11 is a side view of the drawbar in FIG. 10.

Reference is now made to FIGS. 10 and 11, in which the drawbar 19 is illustrated in a plan view and a side view, respectively. Since the cam shaft 16 is to be inserted through the aperture 28 from one side of the drawbar, the aperture has to have a sufficient large cross-sectional dimension in order to let the cam shaft through. That condition is one of the determinant factors for how large the largest cross-sectional dimension of the drawbar will be, since two leg portions 33, which interconnect the forward and rear portions of the drawbar with each other, has to have a sufficient cross sectional dimension in order to withstand the large forces that the drawbar is subjected to during clamping of a tool holder.

Accordingly, in order to restrict the cross-sectional dimension of the drawbar to such an extent that it can be inserted into the housing through the clamping bore 14 from the forward end of the housing, it is also necessary to restrict the largest cross-sectional dimension of the cam shaft. Accordingly, this is achieved by providing the cam shaft with two cam formations and more precisely a first, large cam formation 34 positioned adjacent the flange 31 and a second, small cam formation 35 positioned at the other end of the cam shaft and being spaced apart by a circular cylindrical portion 36.

The cam formations are arranged to be journalled in first and second seating apertures 37, 38, respectively, in the housing on opposite sides of the drawbar, as is best seen from FIGS. 13, 15, 19 and 21. The cam formations 34 and 35 have different sizes, but are similarly shaped to that extent that they each is formed with a first cam surface 34', 35', each having the same cam pitch per angular measure, as well as a second cam surface 34", 35", each having the same cam pitch per angular measure.

The intermediate circular cylindrical portion 36 is, in the assembled state of the clamping device, positioned within the aperture 28 of the drawbar. This has the result that the end of the cam shaft having the small cam formation 35 can pass through an aperture of the drawbar having a relatively small width in a direction perpendicular to its centre axis 27. In this way, the maximum width of the drawbar can be restricted to such an extent that it can be inserted through the clamping bore 14 from the forward end of the clamping device and yet the cross sectional dimensions of the leg portions 33 can be sufficient large to withstand the occurring forces during clamping of a tool holder.

As is evident from FIG. 10, aperture 28 of the drawbar has a mainly circular shape. However, on a part of the aperture facing in a forward direction the aperture is formed with an extended portion 39 in the direction of its center axis 27. During insertion of the cam shaft 16 through the aperture 28 the largest cross-sectional dimension of the second cam formation 35 can thus be located in parallel with the center axis and pass through the extended portion 39 of the aperture, which makes it possible to restrict the width of the aperture in a direction perpendicular to the centre axis and accordingly also the overall width of the drawbar 19.

As can be further seen from FIGS. 10 and 11, the aperture of the drawbar 19 is formed in a relatively flat and thin body portion 40 at the rear part of the drawbar. In its forward end it is formed with a drawhead 41, which is connected to the body portion via a neck portion 42. Between the neck portion and the body portion the drawbar is also formed with a circular flange 43 and a groove 44 for accommodating the sealing ring 26.

Figure 12:
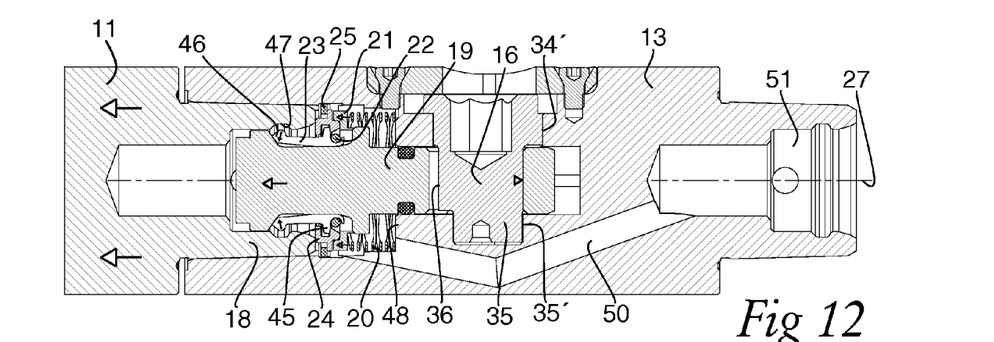
FIG. 12 is a longitudinal cross-section through the clamping device and the tool holder, along the center line, in an initial, unlocked stage.
Figure 13:
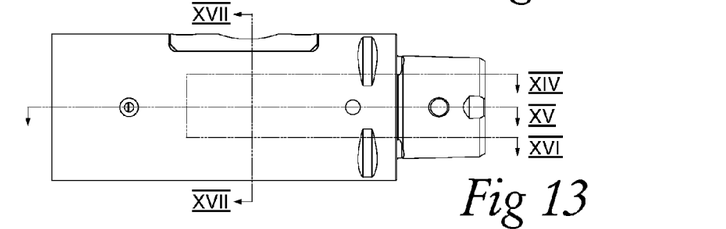
FIG. 13 is a side view of the clamping device.
Figure 14:
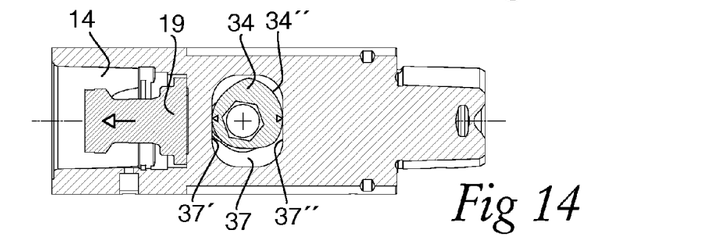
FIG. 14 is a longitudinal cross-section along the line XIV-XIV in FIG. 13 in the unlocked stage.
Figure 15:
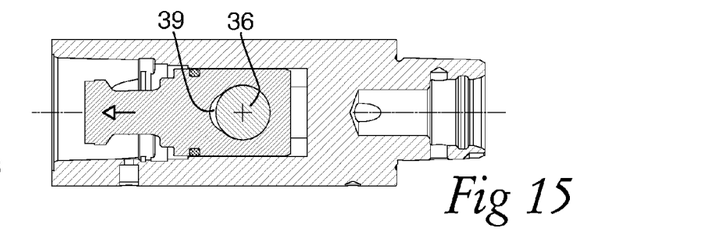
FIG. 15 is a longitudinal cross-section along the line XV-XV in FIG. 13 in the unlocked stage.
Figure 16:
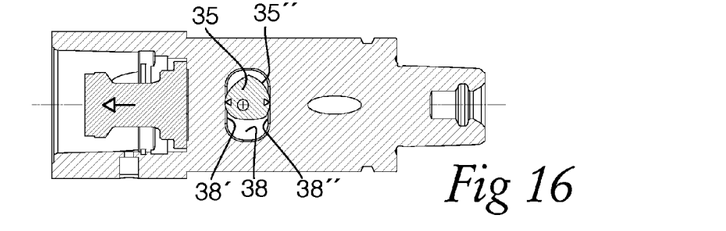
FIG. 16 is a longitudinal cross-section along the line XVI-XVI in FIG. 13 in the unlocked stage.
Figure 17:
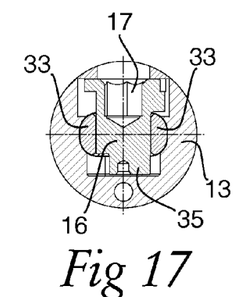
FIG. 17 is a cross-section along the line XVII in FIG. 13 in the unlocked stage.

Reference is now made to FIGS. 12-17 in which is illustrated an unlocked state when the tool holder just has been inserted with its mounting shank 18 into the mounting bore 14 of the clamping device or is to be removed from the clamping device. FIG. 12 is a section along the center line 27 of the assembled tool holder 11 and the clamping device 10 with all its components mounted in place. FIG. 13 is a side view of the clamping device in parallel to the cam shaft and here is indicated the longitudinal and cross-sections in which the FIGS. 14-17 are viewed in the unclamped state of the cam shaft 16 and the drawbar 19. For the sake of simplicity, the clamping device is shown without the tool holder and the coupling mechanism in FIGS. 14-17.

In FIGS. 12-17 the clamping device is in an initial state with the cam shaft 16 rotated to a counter clockwise end position in which the tool holder is unlocked from the clamping device. As can be seen, the engagement segments 23 are mounted around the neck portion 42 of the drawbar in a space formed between the neck portion and an inner surface of an engagement bore within the mounting shank 18 of the tool holder. The engagement segments 24 are held in place by an outward extending flange portion 45 of each engagement segment being in engagement with an inner groove inside the two-part retainer ring 24, and the elastic o-ring 22 is positioned in an outward facing groove formation in the rear end of the engagement segments.

The forward ends of the engagement segments are formed with outward directed engagement flanges 46, which are arranged to engage with an inner engagement groove 47 inside the engagement bore of the tool holder, but are in this initial state out of engagement with the engagement groove. Moreover, the compression spring 20 is mounted between a shoulder face 48 of the housing and the thrust ring 21 and forces it as well as the retainer ring 24 and the engagement segments 23 in the forward direction against the stop ring 25.

In this unlocked state the cam shaft is rotated such that the second cam surfaces 34", 35" of the first and second cam portions 34, 35 act on rear bearing surfaces 37" and 38", respectively, of the bearing apertures 37, 38 (FIGS. 14 and 16) such that the cam shaft 16 is displaced in a direction forward, and the cylindrical portion 36 act on a forward surface of the aperture in the drawbar and, accordingly, the drawbar will be displaced in a forward direction.

Reference is now made to the FIGS. 19-23 which are similar to the FIGS. 12-17. However, here the clamping device is in a locked or clamped state in which the mounting shank 18 is coupled to the clamping device by the coupling mechanism and drawn by the drawbar 19 and the cam shaft 16 with a large force into firm engagement within the mounting bore 14.

This is accomplished in that the cam shaft, from the initial state according to FIGS. 12-17, is rotated clockwise about 180° from the unlocked position to a locked position, in which the first cam surfaces 34', 35' of the first and second cam formations 34, 35 act on forward bearing surfaces 37', 38' of the seating apertures 37, 38 of the housing, which will displace the cam shaft 16 rearward, whereas the cylindrical portion 36 act on a rear surface of the aperture in the drawbar and, accordingly, the drawbar will be displaced in a rearward direction.

Figure 18:
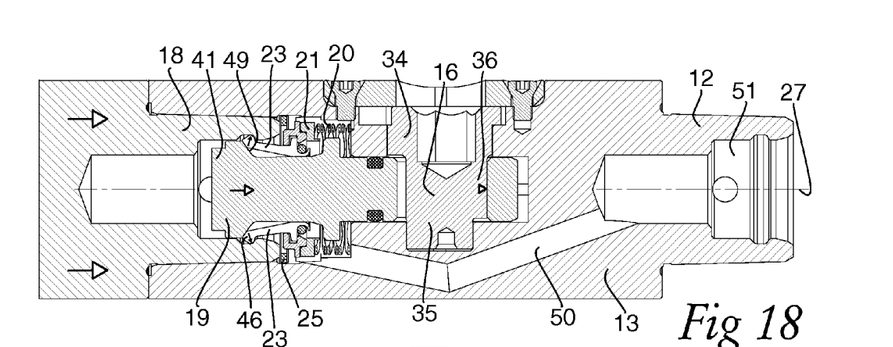
FIG. 18 is a longitudinal cross-section through the clamping device and the tool holder, along the center line, in an activated, locked stage.
Figure 19:
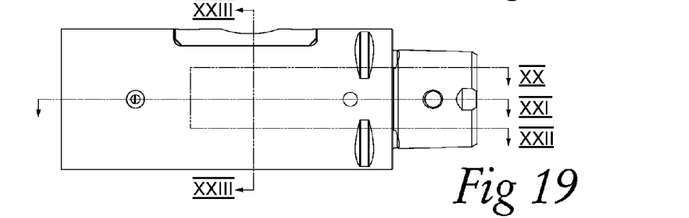
FIG. 19 is a side view of the clamping device.
Figure 20:
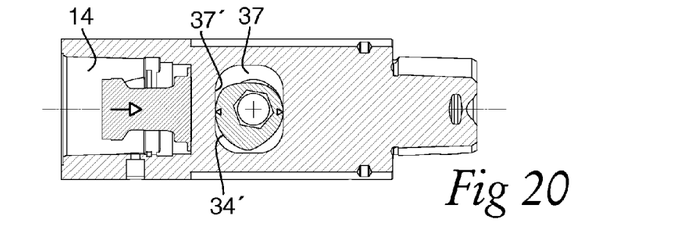
FIG. 20 is a longitudinal cross-section along the line XX-XX in FIG. 13 in the locked stage.
Figure 21:
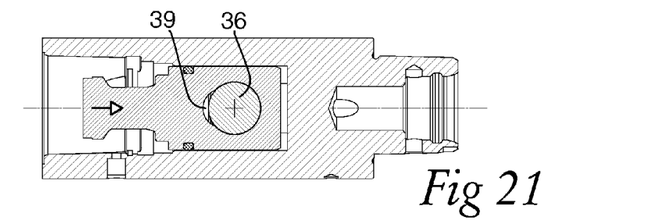
FIG. 21 is a longitudinal cross-section along the line XXI-XXI in FIG. 13 in the locked stage.
Figure 22:
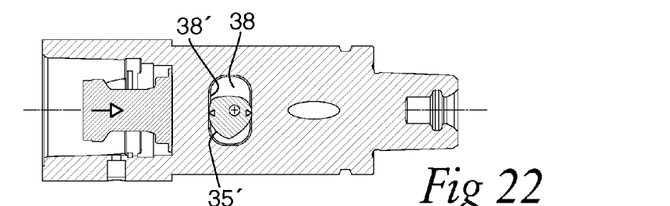
FIG. 22 is a longitudinal cross-section along the line XXII-XXII in FIG. 13 in the locked stage.
Figure 23:
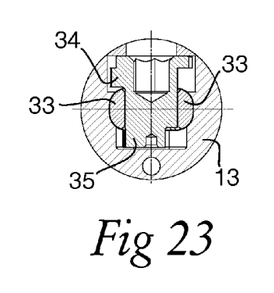
FIG. 23 is a cross-section along the line XVIII-XVIII in FIG. 13 in the locked stage.

This locked position is illustrated in a longitudinal cross=section along the center axis according to FIG. 18. As can be seen, the thrust ring 21, the retainer ring 23 and the engagement segments 23 are still pushed forward toward the stop ring 25 by the compression spring 20, while the drawbar 19 is drawn rearward by the cam shaft 16 as described above. This has the effect that the drawhead 41 will be displaced inwards in relation to the engagement segments 23 such that their forward ends will slide on a rearward facing bevelled surface 49 of the drawhead 41. In this way the engagement flanges 46 on the forward ends of the engagement segments will be displaced outwards and engage with the engagement groove 47 inside the engagement bore of the tool holder such that the tool holder shank 18 will be drawn by means of the drawbar 19 into firm bearing against the surfaces of the mounting bore 14 in the housing.

A further advantage with the clamping device as disclosed herein is that it is provided with a fluid channel 50 for distribution of cooling medium, liquid or gas, from the rear end of the clamping device to the tool holder. One difficulty with providing such a cooling system is that it is not desired that the fluid passes through the space where the cam shaft 16 is accommodated. For one reason it could be difficult to seal the cam shaft for preventing leakage of cooling fluid. Another problem is that some form of lubricant is normally used between the sliding surfaces of the cam shaft and the drawbar, which lubricant could be washed away if a cooling medium flows through there. These problems have been overcome by forming the drawbar 19 with a relatively flat and thin body portion 40 at the area around the aperture 28, as well as making the cam shaft 16 so short such that it does not reach through the housing 13. In this way the fluid channel can pass by the cam shaft within the housing in the area between the end of the second cam formation 35 and the outer circumference of the housing 13.

The fluid channel can be formed by drilling a straight hole from the mounting bore 14 in the forward end as well as a straight hole from an engagement bore 51 within the mounting shank 12 in the rear end of the clamping device, wherein the straight holes meet at an angle in the area between the cam shaft and the outer circumference of the housing.

Although the present embodiment(s) has been described in relation to particular aspects thereof, many other variations and modifications and other uses will become apparent to those skilled in the art. It is preferred therefore, that the present embodiment(s) be limited not by the specific disclosure herein, but only by the appended claims.

The invention claimed is:

1. A clamping device for releasably holding a tool holder shank formed with a bore comprising:
   a housing having a forwardly facing surface and a bore intersecting the forwardly facing surface and extending rearwardly therefrom for receiving the tool holder shank;
   a drawbar mounted reciprocally movable inside the bore and which in a forward end includes a plurality of engagement segments arranged to engage with an engagement formation inside the bore of the tool holder shank, the drawbar being in a rear portion formed with a drawbar aperture extending through the drawbar in a transverse direction in relation to a longitudinal axis of the same; and
   a cam shaft extending through the drawbar aperture and including a cam formation, wherein the cam shaft is rotatably journalled in the housing and arranged to impart an axial displacement to the drawbar in relation to the housing by the cam formation when rotating the cam shaft wherein the cam shaft includes first and second spaced apart cam formations and an intermediate circular cylindrical portion located between the cam formations, the first and second cam formations being rotatably journalled in a first and second seating aperture, respectively, in the housing on opposite sides of the drawbar, whereas the intermediate circular cylindrical portion is extended through the drawbar aperture, wherein each of the cam formations includes a first cam surface, each having a same cam pitch per angular measurement and being operable to urge the drawbar rearward to a locked position, in which it firmly locks the tool holder shank to the clamping device, as well as a second cam surface, each having the same cam pitch per angular measurement and being operable to positively displace the drawbar forward to an unlocked position in which the tool holder shank is releasable from the clamping device, wherein the drawbar is insertable into the bore through the forwardly facing surface, and wherein the second cam formation has a smaller cross-sectional dimension than the first cam formation, such that the second cam formation is insertable through the first seating aperture and the drawbar aperture during mounting of the drawbar into the clamping device.

2. The clamping device according to claim 1, wherein the drawbar aperture has a mainly circular shape being formed with an extended portion in a forward direction.

3. The clamping device according to claim 1, wherein the drawbar is formed with a relatively flat and thin body portion at an area around the aperture.

4. The clamping device according to claim 1, wherein the cam shaft has a length that does not reach through the housing.

5. The clamping device according to claim 1, further comprising a fluid channel extending within the housing from its rear end to its forward end and passes by the cam shaft in an area between the end of the second cam formation and the outer circumference of the housing.

* * * * *